United States Patent [19]

Teich et al.

[11] 4,390,768
[45] Jun. 28, 1983

[54] COOK-BY-WEIGHT MICROWAVE OVEN

[75] Inventors: Wesley W. Teich, Wayland; Kenneth W. Dudley, Sudbury, both of Mass.

[73] Assignee: Raytheon Company, Lexington, Mass.

[21] Appl. No.: 353,720

[22] Filed: Mar. 1, 1982

Related U.S. Application Data

[63] Continuation of Ser. No. 190,285, Sep. 24, 1980, abandoned.

[51] Int. Cl.³ .............................................. H05B 6/68
[52] U.S. Cl. ...................... 219/10.55 B; 219/10.55 R; 219/10.55 D; 219/10.55 E; 99/325
[58] Field of Search ................. 219/10.55 B, 10.55 M, 219/10.55 R, 10.55 A, 10.55 D, 10.55 E; 73/15 B, 15 GA; 177/211, 25, 26, 245, 264; 99/325

[56] References Cited

U.S. PATENT DOCUMENTS

| | | | |
|---|---|---|---|
| 3,259,056 | 3/1963 | King | 99/325 |
| 3,344,654 | 10/1967 | Erdey et al. | 73/15 GA |
| 3,569,656 | 3/1971 | White et al. | 219/10.55 B |
| 3,813,918 | 6/1974 | Moe | 73/15 B |
| 3,890,825 | 6/1975 | Davis | 219/10.55 B |
| 3,902,354 | 9/1975 | Harlan et al. | 73/15 B |
| 3,909,598 | 9/1975 | Collins et al. | 219/10.55 R X |
| 3,932,723 | 1/1976 | Tamano et al. | 219/10.55 B |
| 4,106,329 | 8/1978 | Takahashi et al. | 73/15 B |
| 4,153,125 | 5/1979 | Hutchinson et al. | 177/211 |
| 4,165,633 | 8/1979 | Raisanen | 177/25 X |
| 4,168,623 | 9/1979 | Thomas, Jr. | 177/25 |
| 4,255,639 | 3/1981 | Kawabata et al. | 219/10.55 B |
| 4,299,115 | 11/1981 | Athey et al. | 219/10.55 R X |
| 4,330,696 | 5/1982 | Pomeroy et al. | 219/10.55 E X |

FOREIGN PATENT DOCUMENTS 46-36543  10/1971  Japan ........................... 219/10.55 M Primary Examiner—B. A. Reynolds
Assistant Examiner—Philip H. Leung
Attorney, Agent, or Firm—William R. Clark; Joseph D. Pannone

[57] ABSTRACT

A microwave oven having four small holes in the floor of the cavity so that weight of food bodies within the cavity can be coupled by four nonconductive support columns protruding through the holes to a scale below the cavity. The scale may provide an analog signal which is a function of the weight. The signal may be converted to a digital input for a microprocessor which calculates the heating time for that weight over an input temperature range.

4 Claims, 12 Drawing Figures

COOK-BY-WEIGHT MICROWAVE OVEN

CROSS-REFERENCE TO RELATED CASES

This is a continuation of application Ser. No. 190,285, filed Sept. 24, 1980, now abandoned.

BACKGROUND OF THE INVENTION

As is well known in the art, microwave ovens cook using a different principle than conventional gas or electric ovens. More specifically, a microwave field in a cavity is absorbed by a food body inducing heat throughout the interior of the food body. Because of the different principle of cooking, traditional techniques and recipes of specifying temperature and time for cooking are not applicable to microwave ovens.

Research and development has been performed to determine new ways to simplify the task of the operator in determining how long to expose the food to microwave energy. One possibility considered was to use the weight of the food to determine the heating time in the microwave oven. Many problems were encountered, one of which was to provide a choke for a scale which would sense the weight of the food within the microwave cavity providing an input to a microprocessor.

SUMMARY OF THE INVENTION

The invention discloses a microwave oven comprising an outer housing, a conductive cavity within the housing, a chamber below the cavity and in the housing, a weight sensing device positioned in the chamber, a plurality of spaced apertures in the floor of the cavity communicating to said chamber, said apertures having a perimeter of less than one-quarter wavelength of said microwave energy, nonconductive vertical columns supported by the weight sensing device and protruding through the floor into the cavity, a plate positioned in the cavity and supported by the columns whereby the weight of objects placed on the plate is coupled to the weight sensing device, said weight sensing device providing a first signal which is a function of the weight supported by said vertical columns, a magnetron for supplying microwave energy to the cavity, a microprocessor, a control panel having an operator selectable means for providing a second signal corresponding to the initial temperature of the object to the microprocessor, and the microprocessor in response to the first and second signals controlling the magnetron. It may be preferable that the weight sensing device be a compliant scale. Also, it may be preferable that the nonconductive columns be transparent to microwave energy.

It may be preferable that in response to the first and second signals, the microprocessor calculate the exposure time to microwave energy to raise the temperature of the object from its initial temperature to a predetermined higher temperature. For example, the initial temperature may be refrigerator temperature at 40° F. and the predetermined temperature may be approximately 65° F. Also, the initial temperature may be approximately 65° F. and the predetermined temperature may be approximately 160° F.

BRIEF DESCRIPTION OF THE DRAWINGS

The following detailed description of preferred and alternate embodiments of the invention will be more easily understood with reference to the drawings wherein.

DESCRIPTION OF THE PREFERRED EMBODIMENT

Figure 1:
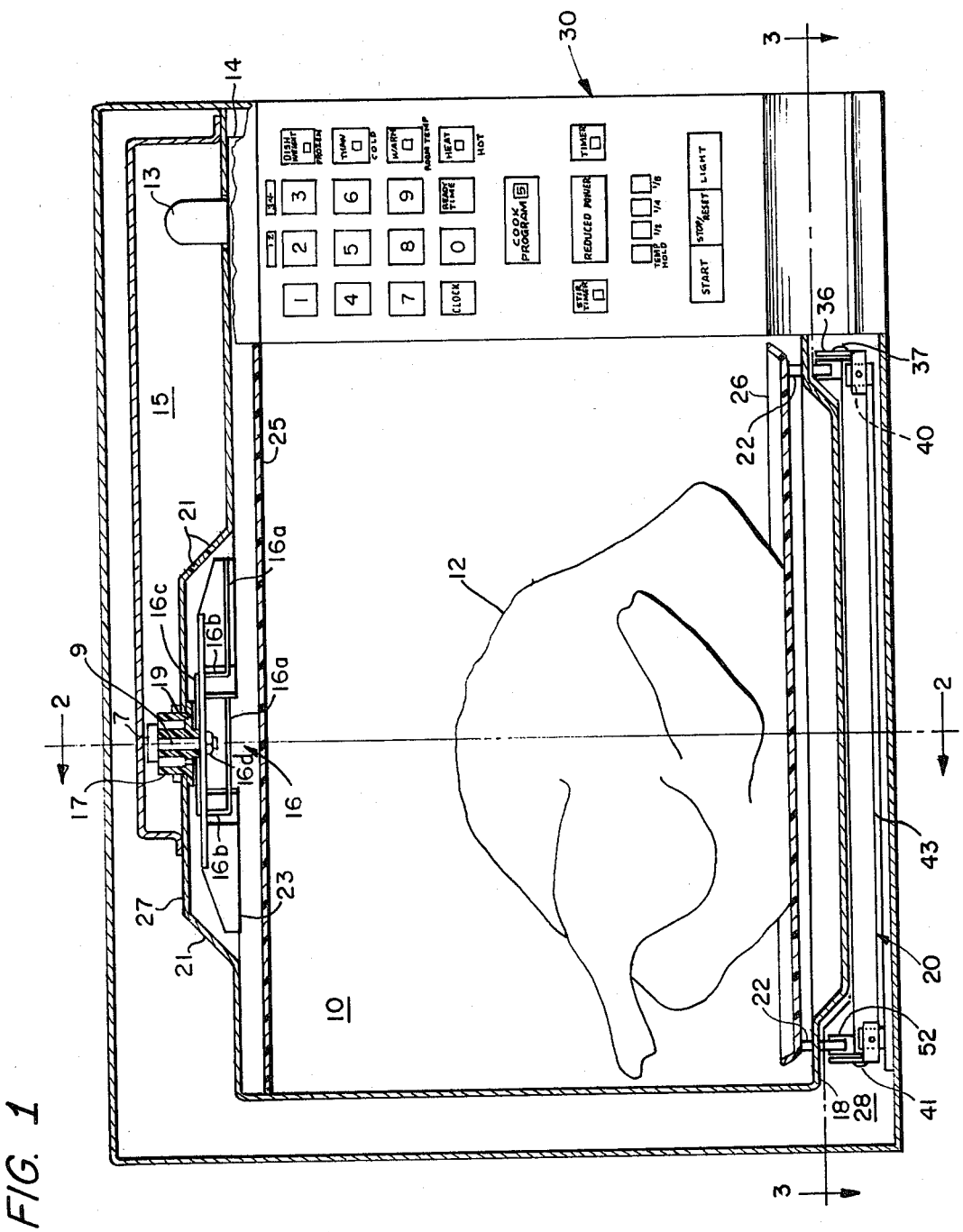
FIG. 1 is a front elevation partially cut away of a microwave oven using the invention to advantage.

Referring to FIG. 1, there is shown a partially cut away microwave oven having a heating cavity 10 containing a food body 12 positioned therein through an access opening provided by a door (not shown). In the present description, it is believed unnecessary to show and describe well known and conventional parts such as, for example, the door seal structure. It is preferable that microwave energy at 2450 MHz from a conventional magnetron 14 be coupled through waveguide 15 to a rotating primary radiator 16 which has a pattern characterized in that a substantial portion of the energy is absorbed by the food before being reflected from the walls of the cavity. More specifically, primary radiator 16 comprises a two-by-two array of antenna elements 16a where each element is an end driven half wavelength resonating antenna element supported by a length of conductor 16b perpendicular to the elements and the upper wall of the microwave oven cavity. Parallel plate microstrip transmission lines 16c connect each of the support conductors to a center junction 16d axial to rotation. At the junction, a cylindrical probe antenna 9 is attached to the radiator 16 structure. Probe antenna 9 which has a capacitive hat 7 is supported by a plastic bushing 17 positioned within the waveguide. The bushing permits rotation of the probe antenna and radiator around the axis of the probe antenna. Microwave energy introduced into waveguide 15 by output probe 13 of magnetron 14 excites probe antenna 9. Energy couples down probe antenna 9 which functions as a coaxial conductor through hole 19 in the upper wall of the oven cavity. The upper wall of cavity 10 is shaped to form a dome 27 having a flattened conical shape extending outwardly in the wall to provide a nearly circular recess partially surrounding the directive rotating radiator and provides uniform energy distribution in the product being heated. The dome returns microwave energy reflected from the food body toward a circular area in the middle area of the microwave oven cavity. It is preferable that air from a blower (not shown) used to cool the magnetron be circulated through the cavity to remove vapors. It may be preferable that this air be channeled into waveguide 15 and passed through apertures 21 in the wall of the dome to provide rotation of radiator 16. Radiator 16 is connected to fins 23 to provide a suitable force surface for the air driven rotation. The fins may be fabricated of a plastic nonlossy material. Other paths may also be used to direct the air from the blower to the fins. Also, in lieu of the air driven method, an electric motor (not shown) may be used to provide rotation of the radiator. Grease shield 25 is transparent to microwave energy and provides splatter isolation from the rest of the cavity.

Figure 6:
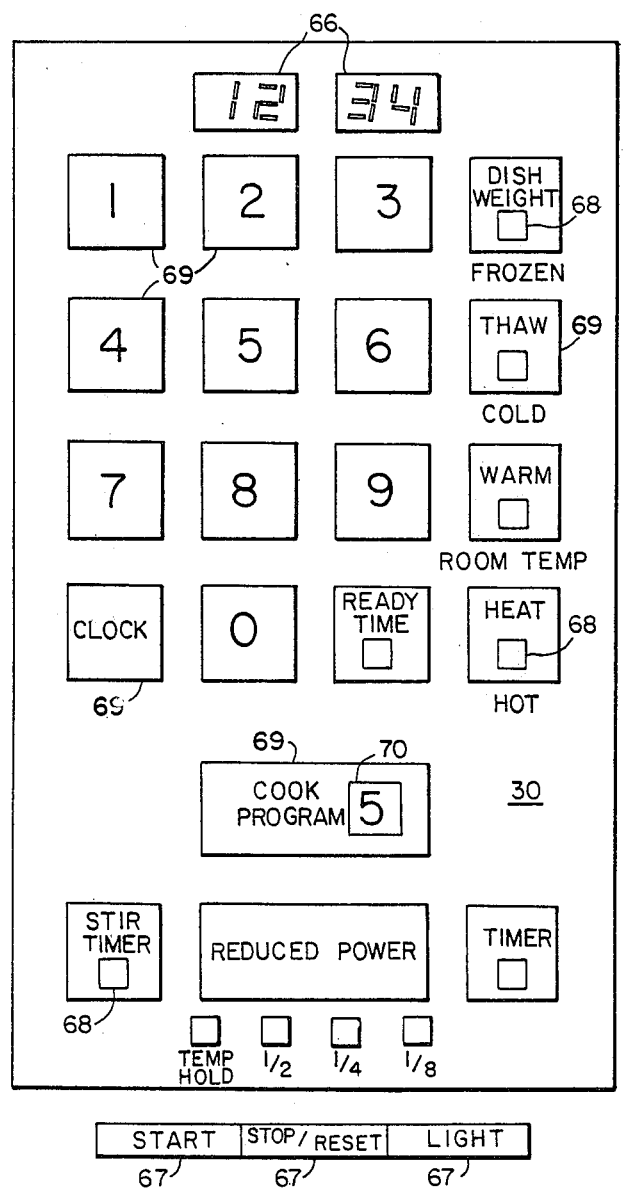
FIG. 6 is an expanded view of the control panel of the microwave oven of FIG. 1.

Control panel 30 which is shown in detail in FIG. 6 provides keyboard functions which are inputs to the control microprocessor 32 and display functions by which the microprocessor indicates status to the user. Any of a number of conventional keyboard switches and displays could be used. It may be preferable that well known capacitor touch pad switches be used for the keyboard. Also, it is preferable that the display provide digital read out of parameters such as time and a simultaneous indication of what keyboard entries have been selected. Specific functions of the control panel will be described in detail later herein.

Positioned below the floor 18 of the cavity is a scale 20. The scale has four vertical support pins 22 which respectively protrude through holes 24 in the floor of cavity 10 in the proximity of the corners. Supported on the pins is plate 26 which rests approximately one inch above the floor of the cavity at the corners. Typically, the plate is made of a pyrex glass material which is transparent to microwaves. The microwaves pass through the glass, strike the floor of the cavity and are reflected back up into the food body from the bottom side. This allows the microwave energy to enter the food body from all sides. Also, the plate may provide some protection for the magnetron if the oven is accidentally turned on when there is no load in the cavity. Although the glass plate may be removed for cleaning, it should always be in the oven during operation. The weight of the glass plate and any food bodies and dishes placed thereon is transferred through support pins 22 to scale 20.

It is desirable that substantially no microwave energy pass through the four pin holes 24 into chamber 28 below the cavity which houses the scale. Accordingly, the pin holes 24 which may preferably be circular, are less than one half wavelength in circumference. More specifically, the holes are slightly larger than the pins which are approximately one quarter inch in diameter. To minimize inaccuracies in scale weighings, it is important that there be as little friction as possible for a pin as it moves up and down through a hole; this may be accomplished by selecting tolerances that accurately position the pins to be concentric with their respective holes and by using materials that have low coefficients of friction. It is preferable that the pins be fabricated of a microwave transparent material such as a ceramic to provide a microwave choke through the holes. If a pin were metallic, the structure would exhibit the properties of a coaxial line with the outer conductor being the surface of the hole and the center conductor being the pin. Microwave energy would pass even though the size of the outer conductor was below cutoff.

Scale 20 comprises four rigid lever arms 36. Each lever arm has an inverted V-bracket 37 on one end to support the arm from a knife edged fulcrum 40. At the other end, each arm is attached to a second arm by a semicircular pivot pin 41 so that there can be vertical motion at the joint of the arm pair between the fulcrums at the opposite ends. The pairs of lever arms 36 so described are positioned parallel to each other so that each arm of the pair has a corresponding arm in the other pair. The corresponding arms are rigidly attached by a V shaped cross bar 43 running perpendicular to the connected lever arms. In the preferred embodiment, each arm is approximately seven inches long and the cross bars which are fourteen inches long are attached approximately one inch from the fulcrums. The scale was designed with these dimensions so that it would fit in chamber 28 and the pins would protrude through holes 24 at appropriate places. The compliant member 44 which resists downward motion of the lever arms at the pivot pin 41 joint is a flexible metal strip that is supported in cantilever fashion from block 46. Rod 48 is attached rigidly and perpendicular to one of the lever arms near the pivot pin joint. The rod has a disk 50 on the end which rests on compliant member 44.

As described earlier herein, the weight of plate 26 and any objects placed thereon is transferred to scale by pins 22 which protrude into the cavity through holes 24 in the bottom cavity wall. Pins 22 are attached to rectangular brackets 52 which limit the upward movement of the pins through holes 24. The rectangular brackets 52 are rigidly connected at inside bottom points of V-shaped cross bars 43 adjacent to the respective lever arms. Regardless of the distribution of downward force between the four pins 22, the force is transferred in approximately the same ratio by the cross bars to the lever arms on the compliant member side of the scale. Rod 48 couples the force from the lever arms through disk 50 to the compliant member 44. As the weight and corresponding downward force is increased, the flexible compliant member bends more; the compliant member is analogous to a spring. The vertical position of the unsupported end of the compliant member is therefore a function of the weight exerted on pins 22. The unsupported end of compliant member 44 is bent downward to form a shade member 57 that shields a particular portion of light beam 54 from being incident on light sensitive device 56. As the weight on plate 26 is increased so that the unsupported end of compliant member 44 bends further downward, a greater portion of the light beam is blocked from being incident on light sensitive device 56. Light sensitive device 56 may preferably be a phototransistor which provides an analog voltage which is a function of the light incident upon it. The source 58 of the light beam 54 may be a light bulb as shown or more preferably a light emitting diode as shown in the alternate embodiment of FIG. 4. It may be preferable to position a concave lens between the source of light and the light sensitive device to focus the beam of light to a relatively small area. Accordingly, the intensity within that area would be varied rather than varying the area of light incidence.

Figure 4:
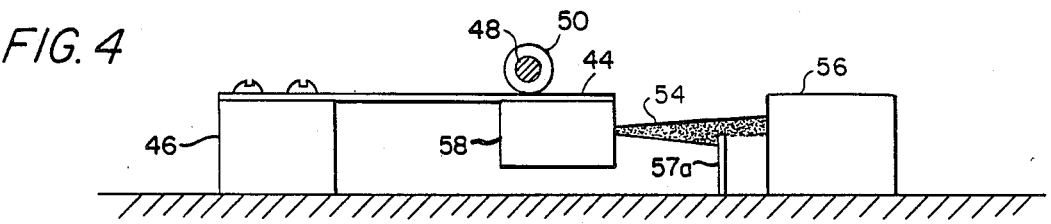
FIG. 4 is an alternate embodiment of the compliant member, light source and light sensitive device of FIGS. 1, 2 and 3.

Referring to FIG. 4, an alternate embodiment of the compliant member is shown. The light source 58 which may preferably be a light emitting diode is attached to the unsupported end of compliant member 44 which is attached in cantilever fashion to block 46. The light beam 54 is directed towards light sensitive device 56. A shade member 57a is positioned between light source and the light sensitive device. As a downward force is exerted on the compliant member by rod 48 through disk 50, an increased portion of the light beam is blocked by shade member 57a. Accordingly, as the weight exerted downward on pins 22 is increased, the analog voltage at the output of light sensitive device 56 is decreased. A different type of shade member may preferably be used which would block the upper portion of the light beam from being incident on the light sensitive device. In this case, as more weight is placed on the scale causing the beam to point further downward, a greater part of the beam would be incident on the light sensitive device because it is not blocked by the shade member. This would mean that the output voltage from the light sensitive device would increase as a function of increasing weight on the scale.

Figure 2:
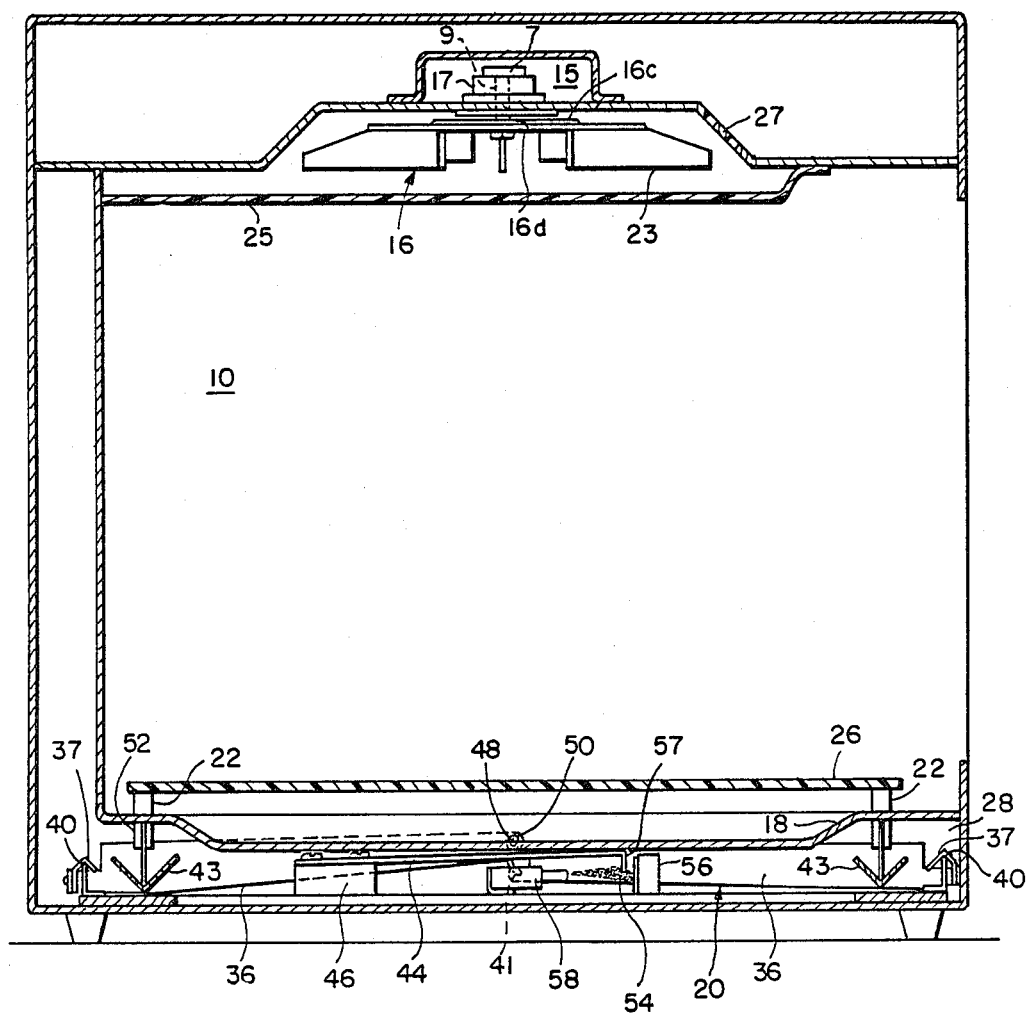
FIG. 2 is a side elevation of the microwave oven of FIG. 1 taken along line 2—2.

Scale 20 provides a means for providing microprocessor 32 with an input indicative of the weight of objects in cavity 10. A substantial advantage of scale 20 so described is that it can be installed in commercially available microwave ovens without significant retooling. More specifically, in the particular microwave oven to which the scale was embodied, chamber 28 had a height of ⅝ inches in the center and approximately 1½ inches at the corners and edges. FIGS. 1 and 2 have not been drawn to scale. The corners and edges of the floor 18 of cavity 10 have always been raised so that a food body supported on plate 26 would be elevated from the conductive surface of the floor where dielectric losses would be very low. The scale which has a height of approximately one inch has its structure in a rectangular shape with nothing in the center so that it fits around the perimeter of chamber 28 where the height is approximately 1½ inches. Furthermore, because there is no structure in the center of the scale, it can be adapted for use in a bottom fed microwave oven as will be described later herein with reference to the alternate embodiment of FIGS. 11 and 12.

Figure 5:
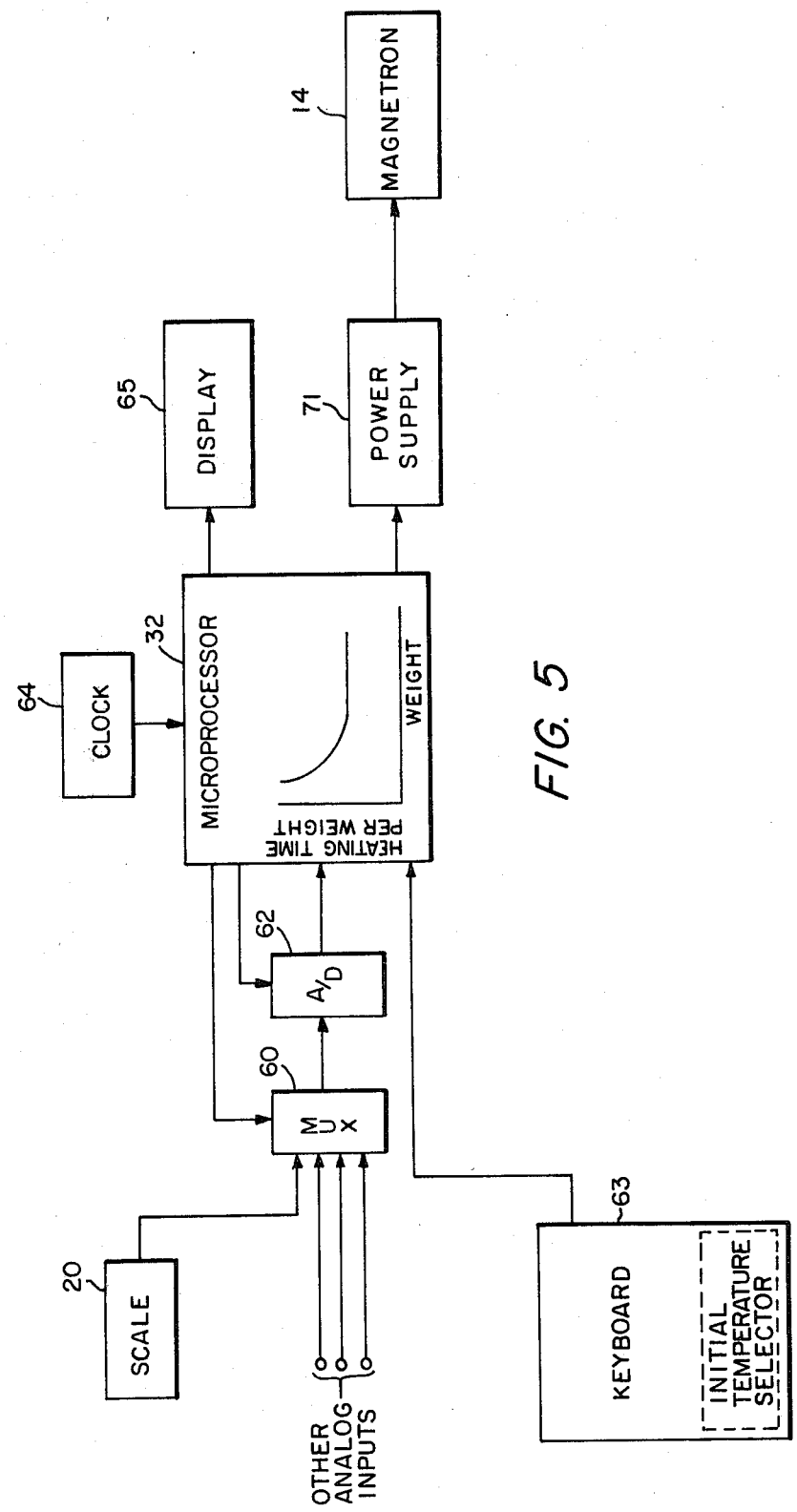
FIG. 5 is a block diagram of a microwave oven system embodying the invention.

Referring to FIG. 5, there is shown a block diagram of a microwave oven embodying the invention. Scale 20 provides an input indicative of the weight of the food body to microwave processor 32. Using the weight of the food body along with other input parameters, the microprocessor determines the output profile of the magnetron in time and power and controls the operation thereof.

Still referring to FIG. 5, the analog voltage output from the light sensitive device of scale 20 is coupled to multiplexer 60 which operates under control of microprocessor 32. The function of multiplexer 60 is to provide the microprocessor with a means of selecting which of a plurality of analog inputs is provided to analog to digital converter 62 for conversion to a digital signal that is acceptable for input to the microprocessor. An example of another analog input is from a conventional microwave temperature probe.

The reference clock for microprocessor 32 is provided by clock 64. Conventionally, clock 64 comprises an AC filter connected to the 60 Hz AC power line and a zero crossing detector, the output of which is coupled to the microprocessor.

Referring to FIG. 6, there is shown an expanded view of control panel 30 of FIG. 1 which panel comprises keyboard 63 and display 65. As stated earlier herein, it may be preferable that the keyboard switches be conventional capacitive touch pad switches. Typically, a touch panel interface may be connected between the keyboard and the microprocessor; the interface is of conventional design and is included in many commercially available microwave oven models. Similarly, a high voltage driver interface may be connected between the microprocessor and displays of control panel 30 to provide lighted indicators. The keyboard includes touch pads 69 numerically labeled 0-9, functionally labeled CLOCK, READY TIME, DISH WEIGHT, THAW, WARM, HEAT, COOK PROGRAM, STIR TIMER, REDUCED POWER, TIMER, and push switches 67 labeled START, STOP/RESET and LIGHT. The display includes digital read outs 66, function indicator lights 68 associated with functionally labeled touch pads, and digital read out 70 associated with the COOK PROGRAM function pad.

In operation, touch pads labeled 0-9 may generally be used conventionally to enter data for well known functions into the microprocessor. For example, when the microwave oven is not being used, digital read outs 66 display the time of day. To change the time of day, the user pushes numerical pads corresponding to the desired time; this time is displayed in digital read outs 66. Then, when the user pushes CLOCK, the displayed time is entered into the microprocessor and becomes the new time of day. Another example is to use the numerically labeled pads to display the amount of time food is to be cooked. Upon pushing START, the display time counts down until the over shuts off. The THAW function pad is used to activate the microprocessor to control the magnetron so that the food is raised from frozen food at 0° F. to thawed food at 40° F. The WARM function pad is used to activate the microprocessor to control the magnetron so that the food is raised from 40° F. to 65° F. The HEAT function pad is used to activate the microprocessor to control the magnetron so that the food is heated from 65° F. to 160° F. The COOK PROGRAM function pad is used to activate the microprocessor to control the magnetron so that the food at 160° F. is taken through the cooking process which may or may not raise its temperature to above 160° F. In other words, the THAW, WARM, HEAT and COOK inputs are indicative of the initial temperature of the food. Before initiating cooking, the COOK PROGRAM which is appropriate for the particular food being cooked may be selected by touching an appropriate numerical pad and then touching COOK PROGRAM. The selected program is displayed in digital read out 70. When in a cook-by-weight mode which will be described in detail herein, the REDUCED POWER pad may be touched to activate TEMP HOLD which decreases the duty cycle of the magnetron. The ½, ¼ and ⅛ indicators are activated by successive touchings of the REDUCED POWER pad during conventional cook-by-time operation. The READY TIME function pad is used to program the microwave oven to come on at a future time. The STIR TIMER is used to sound an alarm and shut off the oven at a time when the food is to be stirred or other action taken within the oven. The TIMER function is used as a count down clock to an alarm for timing which may or may not be associated with the microwave oven. The START button initiates execution of a particular selected programmed subroutine which turns the magnetron on. TheSTOP/RESET button causes the magnetron to be turned off. Successive pushings of the LIGHT button causes a light (not shown) illuminating the cavity to be turned on and off.

The use of microprocessors to control microwave ovens has become common in the last decade. In fact, most if not all of the industry leaders offer top-of-line microwave ovens that are microprocessor controlled. In general, the microprocessor receives inputs from a keyboard and sensors and provides output signals which control the magnetron and drive the display. In FIG. 5, a new sensor which is a scale coupled to weigh objects within the cavity has been added. However, the selection of an appropriate microprocessor and the programming of it to perform specified functions is well known to those skilled in the art. The early microprocessor controlled ovens typically used standard commercially available processor integrated circuits and the application program was provided in a read only memory (ROM); these systems generally required many input/output components to interface the microprocessor to the system. These interfaces are well known to those skilled in the art. In recent years, a continuing trend within the microwave oven industry is to use customized integrated circuits for controlling microwave ovens. The large volume of these specialized integrated circuits has enabled the suppliers to spread the engineering development costs of transforming user requirements to circuits over a large number of integrated circuits thus reducing the cost of the individual unit. Furthermore, there is a continuing trend to integrate more functions onto a single silicon integrated circuit eliminating many of the discrete electronic components and interface hardward such as digit and segment drivers, analog to digital converters, multiplexers, zero crossing detectors, AC filters, and touch panel interfaces. With the foregoing as a background and turning again to FIG. 5, microprocessor 32 in the preferred embodiment is a customized integrated circuit developed by well known techniques and furnished by any one of a number of electronic suppliers. The integrated circuit has interface functions integrated into it. Even multiplexer 60 and analog to digital converter 62 could have been included in the microprocessor integrated circuit such that analog signals are connected directly to the chip. An alternate embodiment of microprocessor 32 will be given later herein.

Still referring to FIG. 5, microprocessor 32 receives inputs from scale 20 and keyboard 63 of control panel 30. In addition to performing many conventional functions such as, for example, cooking for a set time, cooking at a set power, monitoring a temperature probe, and monitoring an interlock, microprocessor 32 performs a new function which relates to simplified user operation. More specifically, the microprocessor uses the weight of the food as weighed within the cavity along with the initial temperature of the food to determine how long the food should be cooked.

Figure 8:
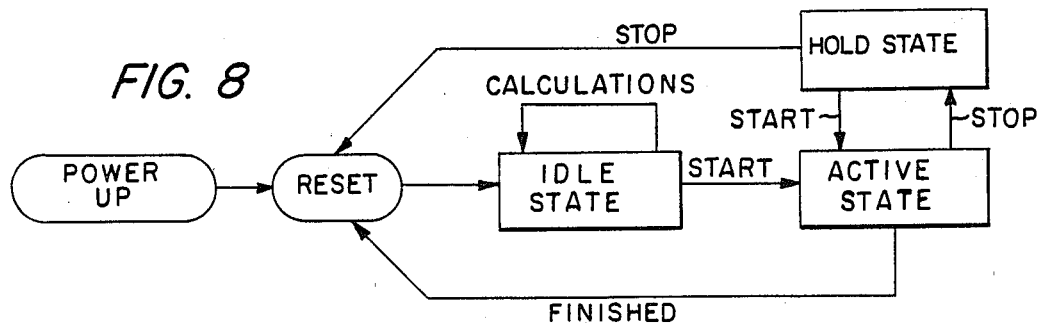
FIG. 8 is a state diagram of the microwave oven using the flow diagram of FIG. 7.
Figure 9:
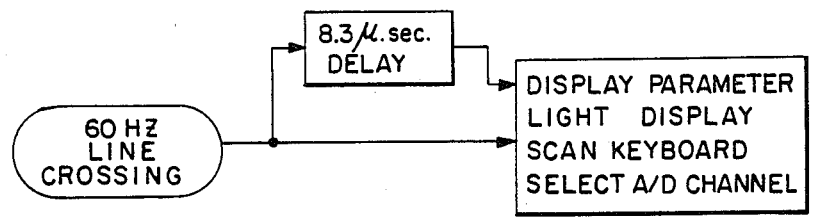
FIG. 9 is the interrupt scheme used in conjunction with the software flow diagram of FIG. 7.
Figure 7:
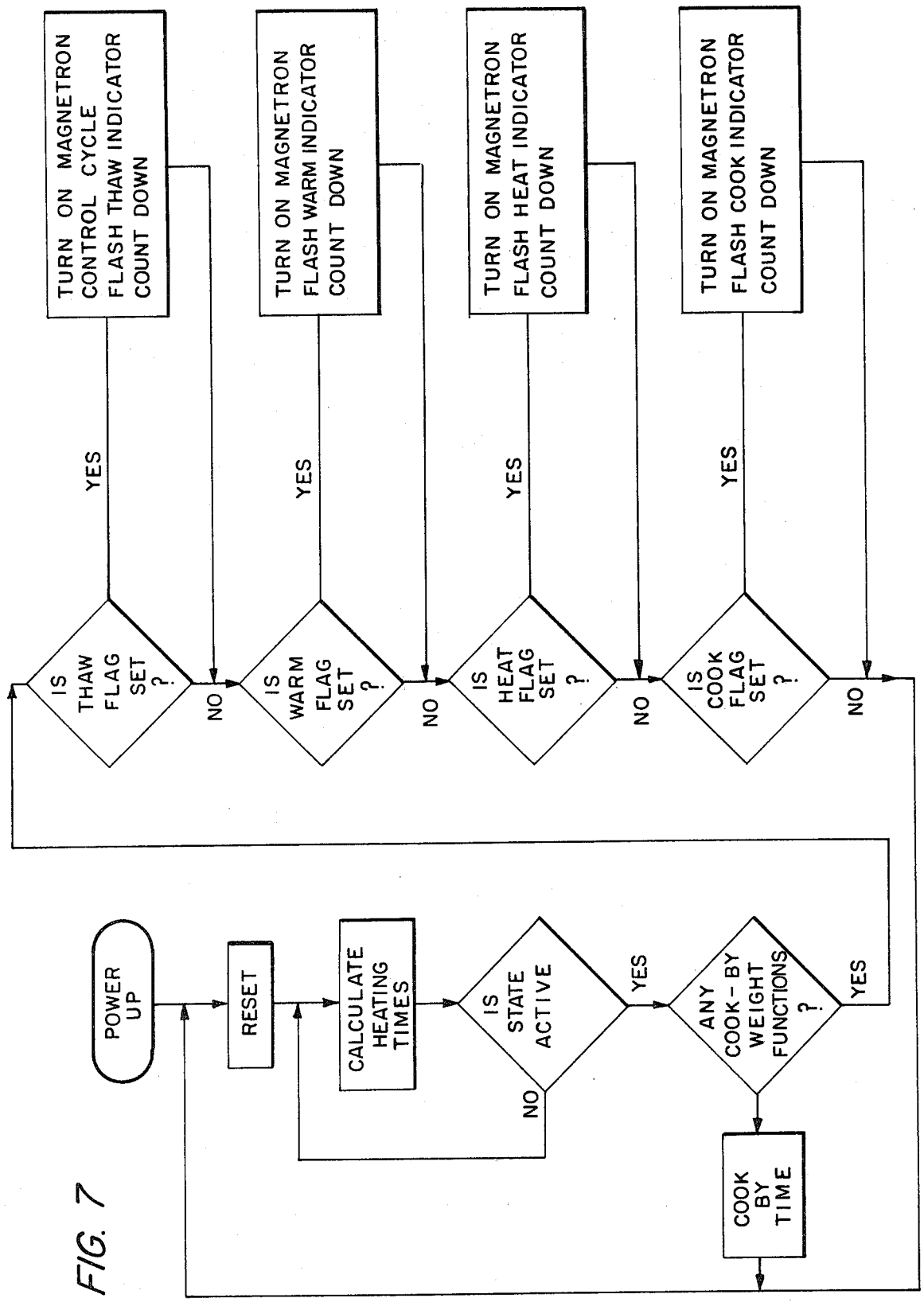
FIG. 7 is a software flow diagram of the programming of a microwave oven embodying the invention.

Referring to FIGS. 7, 8 and 9, software flow diagrams for the programming of microprocessor 32 in accordance with the invention are shown. Many conventional functions such as monitoring an interlock are not included in the discussion herein but the inclusion of them in the flow diagrams and the programming of microprocessors from flow diagrams in general is well known to those skilled in the art. Referring first to FIG. 7, after POWER UP, the microprocessor is initially RESET which includes a number of conventional software house-cleaning procedures such as initialization of output channels. The following equation is used to CALCULATE HEATING TIMES.

$$\text{Heating Time} = ([HUS][FW + (DW)(SHD)]) / ([OPL][PLS][CF])$$

where HUS is Heat Units Selection, FW is Food Weight, DW is Dish Weight, SHD is Specific Heat of Dish, OPL is Oven Power Level, PLS is Power Level Selection and CF is Coupling Factor.

The first term in the heating time equation is Heat Units Selection which is expressed in BTUs per pound of food. It has been found that the required heat units per weight unit of food is in part a function of the temperature range over which the food is to be heated and chemical and/or physical changes taking place within the food. By a very simplified user input from the keyboard, this term of the equation is determined. More specifically, referring again to FIG. 6, the user indicates the initial temperature state of the food by touching THAW which as labeled is for frozen foods (0° F.), WARM which as labeled is for cold foods (40° F.) such as out of the refrigerator and/or HEAT which as labeled is for food at room temperature (65° F.). Touching of more than one of these pads initiates a separate cycle for each function and a separate calculation of the heating time equation for each cycle. For the THAW cycle, 100 BTUs per pound is entered into the equation; for the WARM cycle, 25 BTUs per pound is entered into the equation; for the HEAT cycle, 100 BTUs per pound is entered into the equation; and for the COOK cycle, 25–250 BTUs per pound is entered into the equation depending on the COOK PROGRAM that is selected by touch pads and that is displayed within the COOK PROGRAM touch pad. Although the Heat Units Selection entry into the equation for COOK determines the heating time for a maximum power level, that time will be increased by a specific factor if a REDUCED POWER setting is selected. In other words, the same number of BTUs for the cooking task are delivered but over a longer period of time for more delicate cooking or simmering.

The second term in the heating time equation is [Food Weight+(Dish Weight) (Specific Heat of Dish)]. The presence of the Food Weight in the equation is obvious; the multiplication of its units (pounds) by the units of Heat Units Selection (BTU per pound) yields BTUs for the numerator of the equation which when divided by the units (BTUs per minute) of the denominator, gives the quotient in minutes which are the desired units. The inclusion of (Weight Dish) (Specific Heat of Dish) is to compensate for a certain portion of the heat which is provided to the food being transfered to the dish by conduction. In other words, more heat must be delivered to the food than might be thought necessary because some of it is lost by conduction to the dish. For user simplicity, the specific heat of the dish in the calculation of the heating time equation is assumed to be a constant of 0.2 for the WARM and HEAT cycles where the temperature of the dish is raised by conduction as the temperature of the food rises. For the THAW and COOK cycles, the specific heat of the dish is set equal to zero to eliminate the product of it and dish weight from the equation; with THAW, the BTUs transferred to raise the temperature of the dish is insignificant compared to the BTUs to thaw the food and with COOK, which starts at 160° F., there is no appreciable rise in temperature. Although a more exacting expression of the heat lost by the food (and accordingly the additional heat required to be delivered to it) would also include the specific heat of the food and heat rise in gases in the cavity, empirical analysis has showed that the assumptions were adequate for proper operation of the oven using the heating time equation. In operation, when the light indicator on the DISH WEIGHT pad is on, it is indicative that a dish weight is stored in the microprocessor. Therefore, to commence a new cooking process with a new dish, the DISH WEIGHT pad is touched and the light indicator goes out; this erases the previous dish weight from the microprocessor memory and "zeros the scale". The weight of the dish may then be set up for entry into the microprocessor by either entering it through the numerical touch pads if it is known or by placing the dish without food in the oven where it depresses the scale. With a second touching of the DISH WEIGHT pad, the indicator light thereon goes on indicating that the new dish weight has been entered into the microprocessor. It may be preferable that the analog voltage at the output of light sensitive device 56 be somewhat linear with the weight that is placed on the scale. With this being the case, a linear analog to digital converter properly scaled can be used so that the microprocessor directly samples weight in pounds. If the analog voltage is not linear with weight such as being inversely proportioned as the embodiment of FIG. 1, it can be compensated for in the microprocessor by such conventional techniques as a lookup table. For accuracy of weighing, it may be preferable that at a weighing time, the microprocessor take a plurality of weight samples, discard high and low weights, and average the remainder of the weights. The weight of the food is calculated by the microprocessor by using the weighing immediately prior to the START button being pushed and subtracting the weight of the dish after zero adjustment.

The first term in the denominator of the heating time equation is Oven Power Level. In the microprocessor calculation, it has been assumed that this value is a constant of 725 watts or 41.2 BTUs per minute. In actual operation, there is generally an error in this assumption. Even ovens of the same model and manufacturer will typically vary over a range of 100 watts from unit to unit. It is this inconsistency of output power that has caused producers of prepared foods to specify in the microwave cooking directions on the box that microwave processing times may vary; this is true even though the characteristics of the food product are well defined and can easily be empirically determined. Furthermore, output power may vary as a function of the AC line voltage. The error in the assumption of 725 watts as the output power can be minimized by attempts to normalize ovens to that value.

The second term in the denominator of the heating time equation is Power Level Selection. If the REDUCED POWER pad has not been used to select TEMP HOLD, a value of 1 is used for PLS in the heating time equation. If the REDUCED POWER pad has been used to select TEMP HOLD, 0.3 plus 0.04 per pound of food is input to the equation. For example, if the food weighs 1 pound, the magnetron will operate at 34 percent of full power. Further, if the food weighs 2 pounds, 38 percent of full power will be outputted. This is implemented by decreasing the duty cycle of the magnetron. In the past, it was generally accepted that just as some foods cook better conventionally at lower rather than higher temperatures, some foods cook better at reduced microwave energy power levels. Accordingly, most microwave ovens provide many power level selections. As part of the development of the cook-by-weight process, it was found most important to determine the total number of BTUs required for the particular food and then deliver them; however, the rate at which microwave energy is supplied is not so critical. In fact, the TEMP HOLD feature provides only one reduced power level setting and that is a function of the weight of the food. Generally, the reduced power of TEMP HOLD is used to best advantage with food having a large volume where the microwave energy penetration to the center of the food is greatly reduced. Additional cooking time may be desirable to permit heat in the outer portion of the food to conduct toward the center for more uniform heating and cooking. It has been found that the most appropriate reduced power setting is one which holds the food at temperature which for lightweight foods is approximately 30 percent of full power. The additional 4 percent per pound in the PLS formula compensates for larger food bodies having greater surface areas and therefore greater heat losses that must be compensated for to maintain temperature. The assumption that food surface and size generally relates to weight has been empirically tested.

The last term of the heat time equation is Coupling Factor. Not all of the microwave energy output from the magnetron is coupled into the food. Some of the energy is lost in the system such as in the walls, waveguide, and the plate. The percent of total energy (assumed to be 725 watts) that is converted into heat in the food is in part a function of the food surface area and its absorptivity. For example, if one potato takes four minutes to cook, two potatoes will generally take less than eight minutes or twice that. This is because as the load is increased, a larger percentage of the total power is absorbed by the food. It has been found that the distribution of energy into the food with respect to losses is approximately expressed by the following formula.

Coupling Factor = [Food Weight/(Food Weight + K)]

In essence, the constant K can be viewed as losses of the oven expressed in terms of weight. Constant K has been assigned the value of 0.1. Accordingly, if the food weighs 0.1 pounds, the coupling factor is one half or the heating time is increased by a factor of 2 over which it would have otherwise been. If, however, the food weighed 1.0 pounds, the heating time would only be increased by a factor of 1.1. In FIG. 5, microprocessor block 32 indicates that the heating time per weight unit decreases as a function of increasing weight because of the improved coupling of microwave energy into the greater food mass.

The discussion of the calculation of the heating time equation has assumed that certain keyboard entries such as data relating to initial temperature of the food and sensor entries such as the weight of the food be available to the microprocessor. The required information which is provided before the initial calculation and is periodically updated is provided by interrupts as shown in FIG. 9. At the 60 Hz line crossings and at the time midpoints therebetween as indicated by the 8.3 MICROSECOND DELAY, the processor is interrupted at which time it DISPLAYS PARAMETERS, LIGHTS DISPLAY, SCANS KEYBOARDS and SELECTS A/D CHANNEL. At these times, the present keyboard data and scale data in the microprocessor memory is updated.

Referring again to FIG. 7, after the calculation of the heating time equation for the specific operational parameters, the program branches at IS STATE ACTIVE? The active state is defined in FIG. 8 which shows the relationship between oven states. More specifically, after power up, the microprocessor automatically goes to a reset state as described earlier with reference to FIG. 7. Next, the microprocessor automatically goes to the idle state wherein the heating time equation is continually calculated. The microprocessor stays in the idle state until the start button of control panel 30 is pushed. At that time, the microprocessor goes to an active state where it stays until either the stop button is pushed or the cooking function is finished. If the stop button is pushed, the microprocessor goes to a hold state from which it can return to the active state by pushing the start button 90 or back to the reset state as initiated by a second pushing of the stop button. Again referring to FIG. 7, if the state is not active, the heating time calculation is executed again. If the state is active, the next question is ANY COOK-BY-WEIGHT FUNCTIONS? These functions as described with reference to control panel 30, are THAW, WARM, HEAT and COOK. If none of these has been selected but the processor is active, it is indicative that the function is cook-by-time. If one or more of the weight functions has been selected, the software initially tests to see IS THAW FLAG SET? If it has, the processor controls the magnetron which is cycled on and off, the cycle duty time being a function of the weight of the food. More specifically, the THAW function as described earlier provides magnetron on-time to supply 100 BTUs per pound to the food. The power level is always 100 percent. If the food weighs less than 3 pounds, 100 BTUs per pound is provided with an equivalent off time before the next function. If the food weighs 3 or more pounds but less than 10 pounds, the same 100 BTUs per pound is supplied but in increments of 25 BTUs per pound with time intervals therebetween equal to the time required to supply 50 BTUs per pound. If the food weighs 10 or more pounds, it is the same as the previous sentence except the off time intervals are equal to the time to supply 75 BTUs per pound. Also, the flash thaw indicator on control panel 30 is flashed. As described with reference to FIG. 9, this action would be taken at the 60 Hz line crossings and the midpoints therebetween. Also, the thaw time would count down. At the end of the thaw cycle or if no thaw cycle was selected, the microprocessor determines IS WARM FLAG SET? If it has, the microprocessor turns on the magnetron, flashes the warm indicator and counts down until the end of the warm cycle. At the end of the warm cycle or if no warm cycle was selected, the microprocessor determines IS HEAT FLAG SET? If it has been, the microprocessor turns on the magnetron, flashes the heat indicator and counts down until the end of the heat function. At the end of the heat cycle or if no heat cycle was selected, the microprocessor determines IS COOK FLAG SET? If it has been, the microprocessor turns on the magnetron, flashes the cook indicator and counts down until the end of the cook cycle. At the completion of this cycle or if the cook flag was not set, the software flow returns to the reset subroutine.

Again referring to FIG. 5, the microprocessor, using techniques well known to those of ordinary skill in the art, controls the power supply 68 for the magnetron 14. When the cooking time is finished, the microprocessor controls power supply 71 to shut off magnetron 14. If the cooking time is to be performed at reduced power, the microprocessor regulates the duty cycle of the magnetron. The microprocessor simultaneously provides a visual indication on display 65 of the time for the magnetron to be on and what functions have been selected.

The invention provides a significant advance in the microwave heating art in that it is a major step towards one button simplified operation. Many former problems associated with the user determining cooking parameters have been overcome. The weight of the food which is provided automatically by a scale in the oven is entered into a microprocessor which is programmed to calculate the proper cooking time and then controls the magnetron in addition to giving an operational status to the user through displays.

Figure 10:
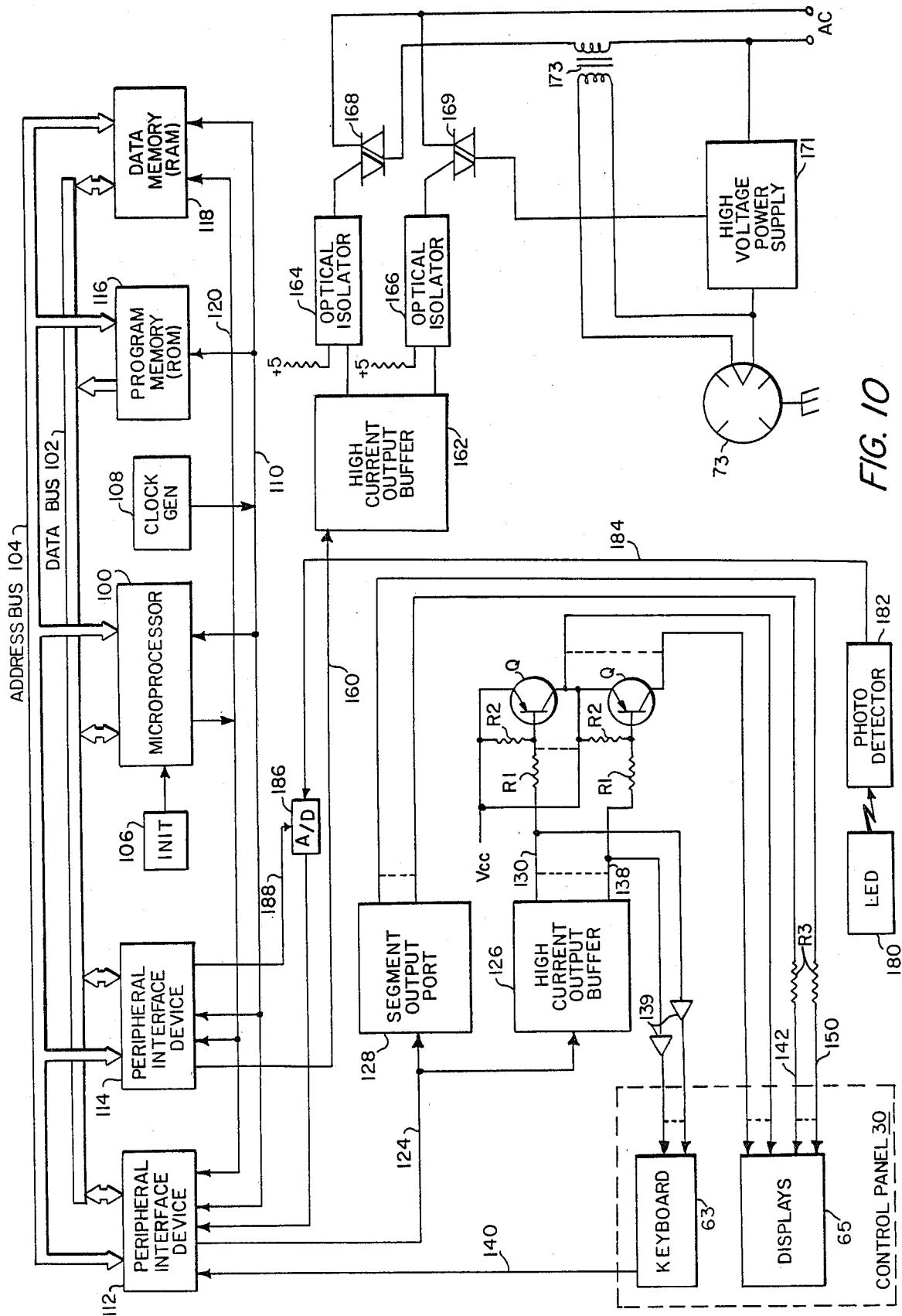
FIG. 10 is an alternate embodiment of the microprocessor and associated hardware used in FIG. 5.

Referring to FIG. 10, an alternate embodiment of the circuit of FIG. 5 is shown. As described earlier herein, for commercial applications, it may be preferable that the microprocessor control be provided by a customized integrated circuit which includes therein many of the interface functions. The embodiment of FIG. 10 shows a general purpose microprocessor with ancillary hardware and interfaces coupling it to the microwave oven control panel, sensors, and magnetron control. An example of microprocessor 100 that could be used is a MOS Technology, Inc. MCS6502. As shown in FIG. 10, the microprocessor is connected to data bus 102 which typically comprises eight lines which may be connected to MCS6502 pins 26-33, respectively. The microprocessor is also connected to address bus 104 which typically comprises sixteen lines which may be connected to MCS6502 pins 9-25, respectively. Conventional initiating circuitry (INIT) 106 is used only at power up time by the microprocessor and may be connected to input pins 6 and 40 of microprocessor MCS6502. Further, a conventional crystal clock (CLOCK GENerator) 108 is required and may be input to the microprocessor on pins 37 and 39. Line 110 is used to provide the clock to peripheral interface devices 112 and 114, program memory (ROM) 116 and data memory (RAM) 118. Microprocessor 100 provides the same functions as the microprocessor described with reference to FIG. 5. The program memory 116 which preferably is a read only memory stores the operational program. The task of writing the program from the requirements given herein with reference to FIGS. 7, 8 and 9 are well known to one skilled in the art. Microprocessor 100 provides addresses to address bus 104 to fetch instructions from program memory 116 and data from data memory 118 which is a random access memory. Write enable and other control functions are provided from microprocessor 100 to data memory 118 or peripheral interface devices 112 and 114 on control bus 120.

Peripheral interface devices 112 and 114 allow microprocessor 100 to read data from keyboard 63, to test the state of sensors and switches, display the results of internal operations and control the magnetron. Example peripheral interface devices 112 and 114 are MCS6522's which may have pins 21-40 connected to control, timing, interrupt, data bus and address bus. Peripheral interface device 112 provides interface for control panel 30 which includes keyboard 63 and displays 65. Keyboard inputs to the microprocessor are provided by a conventional matrix scan technique. More specifically, the keyboard comprises a matrix of switches which may be of the contact or capacitive touch variety. For the control panel of FIG. 6, a 4×6 matrix would be sufficient; however, a larger matrix will be described and it is assumed that it may contain functions not discussed herein. Output signals are sequentially provided to the columns of the matrix and the rows are sensed and decoded. In detail, pins 10-17 of MCS6522 are connected to eight lines 124 connected to high current output buffer 126 and segment output port 128. At the output of high current output buffer 126 which may, for example, be a 74LS374, eight lines 130-138 as indicated connect through eight amplifiers 139 to the keyboard. Sequence column scanning pulses are provided on lines 130-138; the rows of the matrix of switches of the keyboard are sensed by lines 140 which are connected to pins 1-9 of peripheral interface device 112. The sensed data is decoded whereby microprocessor determines which switches of the switch matrix of keyboard 63 are closed.

Digital displays 65 are scanned which means that each digit is driven for a short period of time, such as two milliseconds, in sequence. The entire display is scanned at a rate which the eye cannot detect. Lines 130-138 are coupled through driver circuits, two circuits in FIG. 6 being representative of eight in the embodiment. Each conventional circuit as shown comprises Vcc which is typically +5 volts, R1 which may be 1.5K ohms, R2 which may be 1.0K ohms, and transistor Q. These sequenced driver circuits determine which digit of the display is activated. The data that determines which segments of a particular digit are on is determined by the output of segment output port 128 which is coupled to lines 142-150 through resistors R3 to displays 65. An example of a segment output port is an MC3482. The data and scan pulses time share lines 124, the enable control to port 128 and buffer 126 being provided on lines not shown by peripheral interface device 114 on pins 3 and 4, respectively.

Microprocessor 100 controls the output of magnetron through peripheral interface device 114. More specifically, outputs from peripheral interface device 114 on lines 160 are connected to high current output buffer 162 which may be, for example, a 74LS374. As shown in FIG. 10, two of the outputs of buffer 162 are connected to conventional optical isolators 164 and 166 which may be, for example, MOC3010s. A LOW voltage (logical 0) at the input of an optical isolator causes the internal resistance of its output to be a short circuit.

In response to a control signal from optical isolator 164, triac 168 is turned on energizing filament transformer 173. In response to a control signal from optical isolator 166, triac 169 is turned on energizing high voltage power supply 171 which typically comprises a regulating transformer in accordance with well known practice. In operation, filament transformer 173 energizes the filament of magnetron 73 and high voltage power supply 171 provides approximately 4000 volts to the plate of the magnetron.

Omitted from FIG. 10 are many common features such as, for example, interlocks, a blower and fuses. Light emitting diode 180 which is part of scale 20 directs light towards photodetector 182. As described with reference to the preferred embodiment, the analog voltage output of the photodetector is preferably substantially linear with the weight of the food in the microwave cavity. The analog voltage output on line 184 is transferred to analog to digital converter 186 which upon command from the microprocessor through peripheral interface 114 on line 188 provides a pulse output which has a time duration determined by the analog voltage input. Information derived from this pulse is transferred through peripheral interface device 114 to microprocessor 100 on data bus 102. By counting the duration of the pulse, microprocessor 100 determines the weight on the scale.

Figure 3:
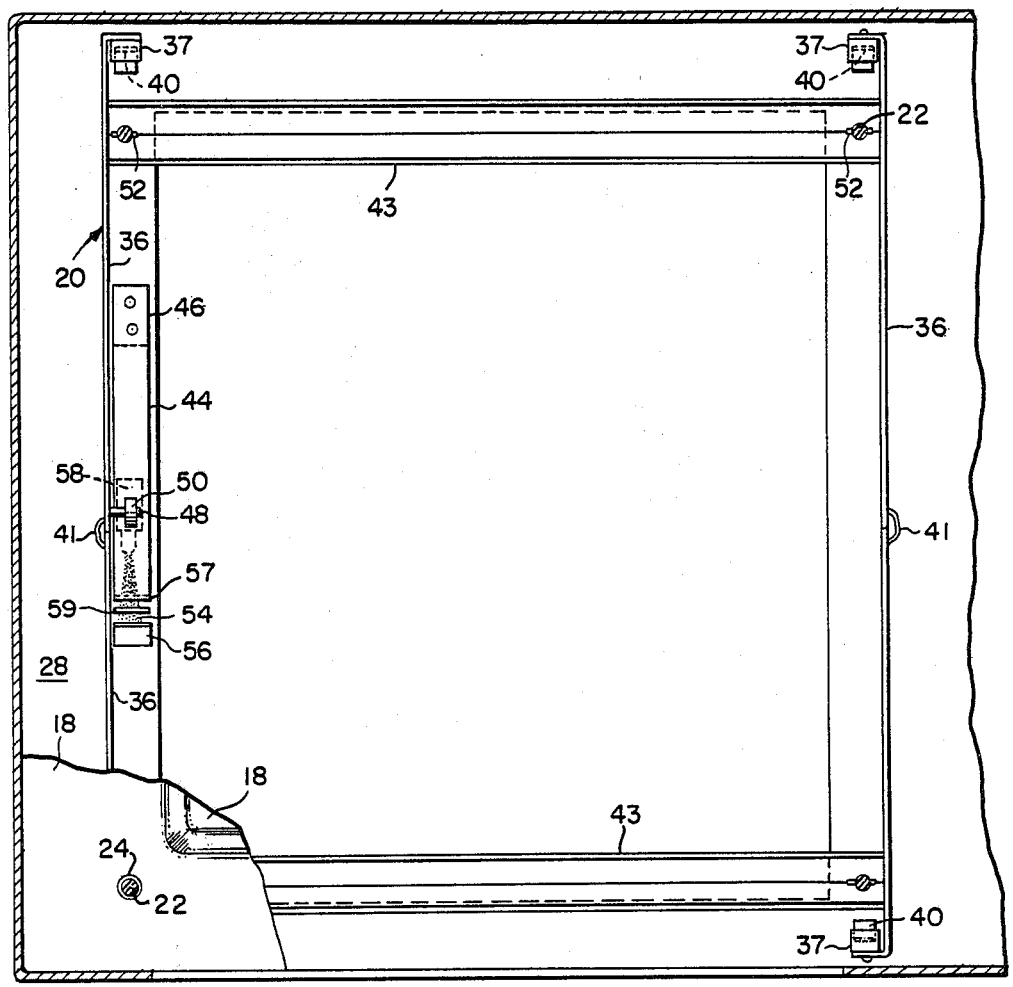
FIG. 3 is a top view of the microwave oven of FIG. 1 taken along line 3—3.
Figure 11:
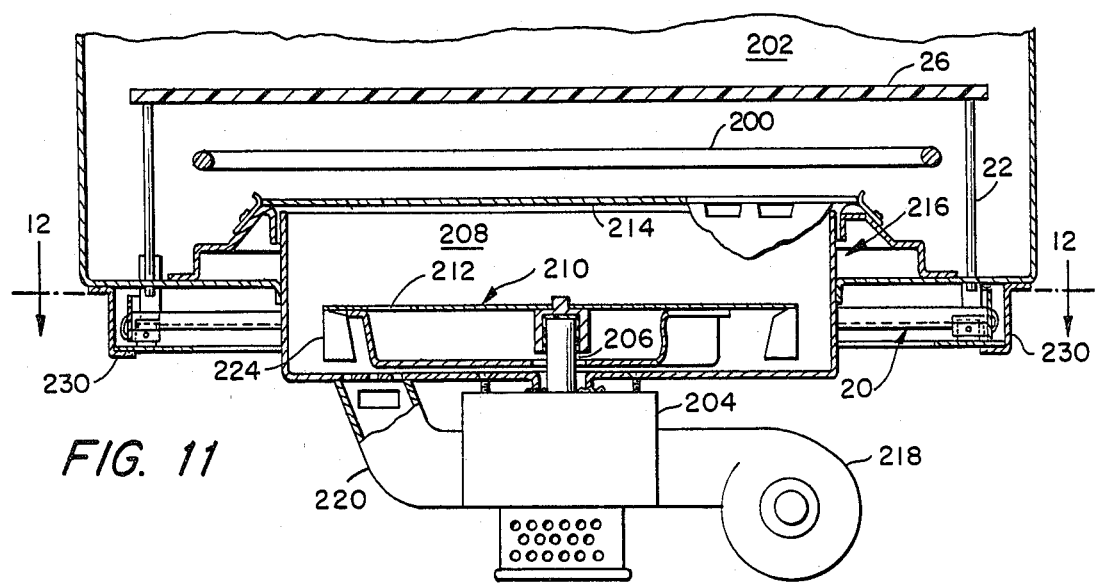
FIG. 11 is a side elevation view of the scale embodied in a bottom fed oven.
Figure 12:
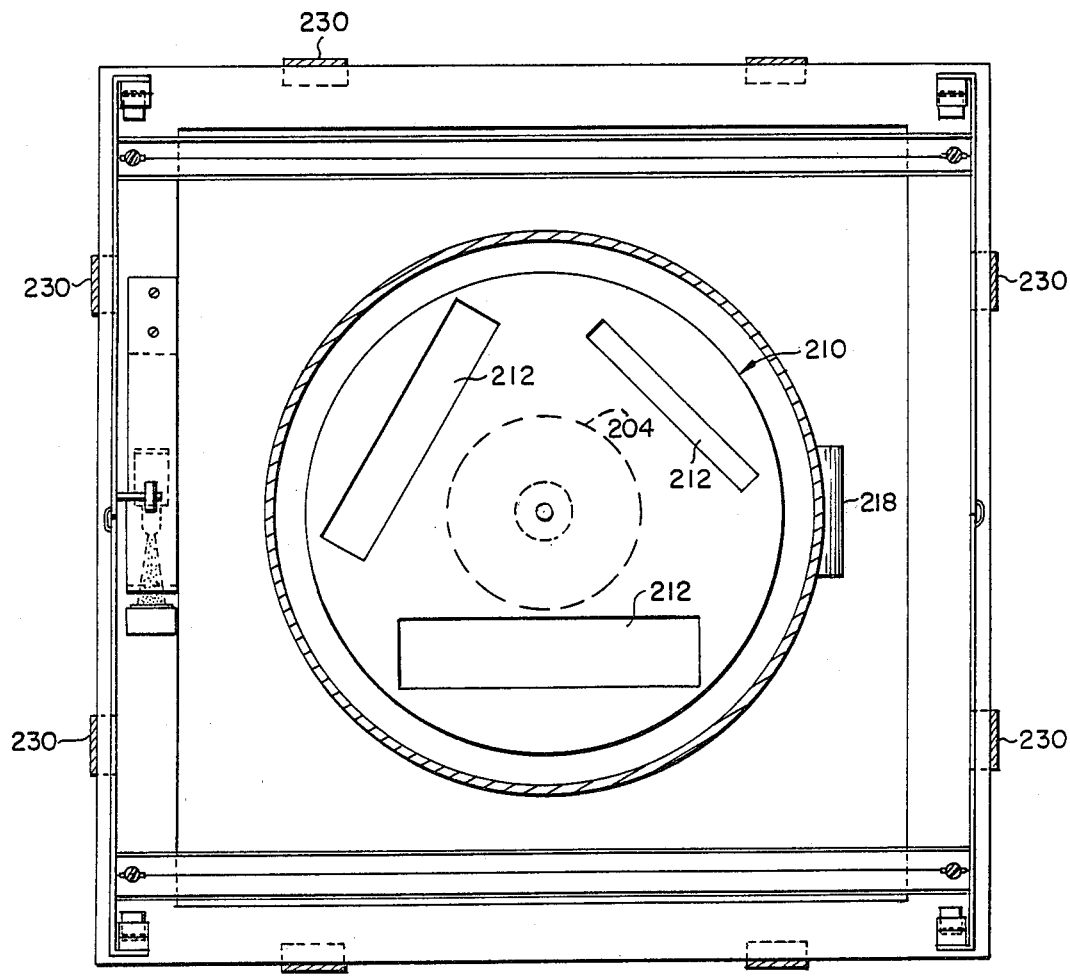
FIG. 12 is a top view of the bottom fed oven of FIG. 11 taken along lines 12—12.

Referring to FIGS. 11 and 12, respective side and top views show scale 20 embodied in a bottom fed microwave oven such as a conventional microwave electric range. Electric heating element 200 is positioned towards the bottom of cavity 202 of a microwave electric oven. The microwave energy is provided by magnetron 204 which has an output probe 206 which is inserted directly into well 208 of the cavity. The microwave energy couples from the output probe 206 through a directive radiator 210 having three antenna ports 212. The microwave energy propagates through microwave transparent cover 214. Choke structure 216 prevents microwave energy from leaking out of the gap between well 208 side walls and the floor of the cavity. A blower 218 directs air across the fins of magnetron 204 and up into well 208 by duct 220 through apertures 222. The flow of air may be used to provide a force on veins 224 of radiator 210 to provide rotation. Scale 20 which is the same as that described with reference to FIGS. 1, 2 and 3, is supported by brackets 230 extending downward from the oven floor as shown in FIG. 11. Because scale 20 substantially forms a rectangle without structure in the interior, the bottom fed microwave source can be positioned in the middle of the oven floor without structural interference. Pins 22 protrude through holes in the floor of the oven to support plate 26. The pins 22 in this embodiment are longer than the embodiment of FIGS. 1, 2 and 3 so as to rise aove electric heating element 200. Pins 22 may also provide support for oven racks so as to provide a weight indication of food bodies placed on them.

This concludes the description of the preferred embodiment. The reading of it however will bring to mind many modifications to one skilled in the art without departing from the spirit and scope of the invention. Accordingly, it is intended that the scope of the invention be limited only by the claims.

What is claimed is:

1. A microwave oven comprising:
    an outer housing;
    a conductive cavity within said housing, said cavity having a substantially rectangular floor;
    a chamber in said housing below said floor;
    a weight sensing device positioned in said chamber;
    said floor having four apertures respectively located in regions adjacent to the four corners, said apertures having a perimeter of less than one-half wavelength of said microwave energy;
    four microwave transparent vertical columns supported by said weight sensing device and respectively protruding through said four apertures in said floor into said cavity;
    a plate positioned in said cavity and supported by said four columns whereby the weight of an object placed on said plate is coupled to said weight sensing device;
    said weight sensing device providing a first signal which is a function of the weight supported by said columns;
    a microprocessor;
    a control panel having operator selectable means for providing a second signal corresponding to the initial temperature of said object;
    a magnetron for supplying microwave energy to said cavity; and
    said microprocessor controlling said magnetron in response to said first and second signals.

2. The oven recited in claim 1 wherein said weight sensing device comprises a compliant scale.

3. A microwave oven comprising:
an outer housing;
a conductive cavity within said housing, said cavity having a substantially rectangular floor;
a chamber in said housing below said floor;
a weight sensing device positioned in said chamber;
said floor having four apertures respectively located in regions adjacent to the four corners, said apertures having a perimeter of less than one-half wavelength of said microwave energy;
four microwave transparent vertical columns supported by said weight sensing device and respectively protruding through said four apertures in said floor into said cavity;
a plate positioned in said cavity and supported by said four columns whereby the weight of an object placed on said plate is coupled to said weight sensing device;
said weight sensing device providing a first signal which is a function of the weight supported by said columns;
a microprocessor;
a control panel having operator selectable means for providing a second signal corresponding to the initial temperature of said object;
a magnetron supplying microwave energy to said cavity; and
said microprocessor in response to said first and second signals determining the exposure time of microwave energy to raise said initial temperature to a predetermined higher temperature, and controlling said magnetron in accordance with said exposure time.

4. The oven recited in claim 3 wherein said weight sensing device comprises a compliant scale.

* * * * *